United States Patent [19]

Maurinus et al.

[11] Patent Number: 5,606,365
[45] Date of Patent: Feb. 25, 1997

[54] INTERACTIVE CAMERA FOR NETWORK PROCESSING OF CAPTURED IMAGES

[75] Inventors: Martin A. Maurinus, Rochester; Wilbert F. Janson, Jr., Shortsville, both of N.Y.

[73] Assignee: Eastman Kodak Company, Rochester, N.Y.

[21] Appl. No.: 412,775

[22] Filed: Mar. 28, 1995

[51] Int. Cl.⁶ ........................................... H04N 3/00
[52] U.S. Cl. ..................... 348/222; 348/552; 348/247
[58] Field of Search ........................ 348/222, 220, 348/223, 232, 242, 230, 247, 246, 251, 254, 13, 12, 187, 466, 143, 148, 157, 159, 17, 6, 468, 552; H04N 3/00, 3/310, 5/232

[56] References Cited

U.S. PATENT DOCUMENTS

| | | | |
|---|---|---|---|
| 3,984,625 | 10/1976 | Camras | 178/5.6 |
| 4,524,381 | 6/1985 | Konishi | 358/29 |
| 4,574,319 | 3/1986 | Konishi | 358/335 |
| 4,962,521 | 10/1990 | Komatsu et al. | 379/53 |
| 5,042,061 | 8/1991 | Kaneko et al. | 379/53 |
| 5,045,948 | 9/1991 | Streck et al. | 358/194.1 |
| 5,063,587 | 11/1991 | Semasa et al. | 379/53 |
| 5,101,499 | 3/1992 | Streck et al. | 455/4 |
| 5,164,836 | 11/1992 | Jackson . | |
| 5,191,410 | 3/1993 | McCalley . | |
| 5,202,957 | 4/1993 | Serrao | 379/53 |
| 5,218,627 | 6/1993 | Corey et al. | 379/53 |
| 5,220,420 | 6/1993 | Hoarty | 358/86 |
| 5,257,306 | 10/1993 | Watanabe | 379/53 |
| 5,264,935 | 11/1993 | Nakajima | 358/181 |
| 5,461,440 | 10/1995 | Toyoda . | |

OTHER PUBLICATIONS

Junko Yoshido, "Set-top box could be budget buster", *Electronic Engineering TIMES*, Nov. 29, 1993.
Junko Yoshido, "TV set-top box choices add to cable confusion", *Electronic Engineering TIMES*, Dec. 6, 1993.

*Primary Examiner*—John K. Peng
*Assistant Examiner*—Nathan J. Flynn
*Attorney, Agent, or Firm*—David M. Woods

[57] ABSTRACT

A digital still camera and interactive system and method for video display or reproduction of captured images employing an image processing system on an interactive network for receiving and converting a captured raw, digitized image information set into a display image format for display as a video image, storage, and/or reproduction as a print. A simplified digital camera without signal compensating and processing circuits is employed by a user to capture an image and to transmit the raw image information sets along with a camera identification code through an interactive television network to an interactive control node for processing with color correction and pixel defect correction using the cameras correction and defect maps and other image enhancement, and to convert the processed image data to the specified display image format. The processed video display signal is transmitted back to the user's or other designated receiver's interactive television home interface controller. The camera specific, correction maps and the color and defect correction algorithms may be provided by the camera manufacturer to the network on registration of the camera and accessed or downloaded by the user or the user's designee. Processing of the raw image information sets may be at a control node within the network or in the user's home interface controller.

30 Claims, 5 Drawing Sheets

INTERACTIVE CAMERA FOR NETWORK PROCESSING OF CAPTURED IMAGES

CROSS-REFERENCE TO RELATED APPLICATIONS

Reference is hereby made to commonly assigned, co-pending U.S. patent application Ser. Nos.: 085,516, filed Jun. 30, 1993, in the names of K. Parulski et al. and titled SINGLE SENSOR COLOR CAMERA WITH USER SELECTABLE IMAGE RECORD SIZE; and 167,756, filed Dec. 15, 1993, in the names of K. Parulski et al. for PORTABLE ELECTRONIC CAMERA WITH COMPUTER DOCKING ADAPTOR PROVIDING COMPUTER CAPTURE CONTROL.

FIELD OF THE INVENTION

This invention relates to the field of electronic imaging employing an interactive image capture system with distributed processing of image information, and more particularly to a simplified digital camera and centralized image processing system.

BACKGROUND OF THE INVENTION

Electronic still cameras are known in the prior art for capturing images of scenes and providing the captured images to a computer for display on a computer monitor. In the above-referenced '516 and '756 applications, electronic still cameras are described for capturing images and displaying the captured images on the monitor employing a computer docking station and interface to download image data to computer memory for display and more permanent storage of the video image data. In those cameras, the camera on-board memory may then be employed to capture further images until it is again filled.

In the '756 patent, the camera is either operable by itself in a stand alone mode to store images in on-board memory or may be tethered to the computer in a docked mode to directly transfer the video image data to the computer memory. In the '516 patent, an electronic still camera is described having a resolution mode switch for selecting the pixel resolution.

Electronic still cameras of the type described in the '516 and '756 applications employ two-dimensional, charge-coupled-device (CCD) arrays of CCD photosites. The CCD photosites are overlaid with a three color filter in a checkerboard pattern. The red, green and blue analog, raw image pixel signals of the CCD photosites are clocked out in a video frame format. The raw image analog pixel signals are digitized, and luminance and chrominance pixel information is developed from the red, green and blue raw image pixel signals. Typically, the luminance signal is derived from the green filtered photosite pixel signals, and chrominance is developed from the red and blue filtered photosite pixel amplitude difference signals, with a green signal interpolation. The digitized video frame signal sets are processed within the cameras to correct for defective photosites within the array and for color balance.

The corrected digital pixel signals are compressed and formatted into a video frame signal for display on a monitor or television at the same or a later time. Typically, the video frame signals for each image captured are stored in flash EEPROM or other memory for later read-out to a personal computer (PC). A central processing unit governs the operations of the circuitry and hardware under the control of programmed operating routines.

Currently, a PC electronic still camera is being marketed by Apple Computer, Inc. which operates in high and low resolution modes to take a limited number of pictures for display through a PC interface. Such electronic still cameras are relatively complex and expensive when constructed to have high resolution and image storage capabilities.

In U.S. Pat. No. 5,220,420, an interactive multimedia system with distributed processing and storage of video frames and associated data and sound in nodes disposed throughout a cable television distribution system is described. An interface to allow users to input video images from a camcorder or VCR into a video to RF modulator in a Home Interface Control (HIC) is also described. The ability to display photographic quality images in both still frame and short full-motion segments on a home television receiver is attributed to the system, although the available video camcorders or VCRs do not support photographic quality images.

An RF to video demodulator and a video digitizer are provided in the node coupled to the HIC to demodulate and digitize the video data input from a camcorder or VCR to forward it to a regional processing center. The regional processing center converts and normalizes incoming digitized video frames into a system standardized format and stores them in an object database in each of the system nodes for selective retrieval by a viewer. No specific camcorder or video camera type is described in the '420 patent, but it is clear that a conventional analog video frame output utilizing the traditional NTSC format is supplied to the HIC to be converted to a digital format by the video digitizer 164.

PROBLEMS TO BE SOLVED BY THE INVENTION

The expense and complexity of the conventional high resolution electronic still image camera inhibits its acceptance in the market for conventional, non-network image capture and storage. The cost of participating in an interactive system is magnified by the expense of acquiring suitable high resolution video image capture cameras.

SUMMARY OF THE INVENTION

It is therefore a primary object of the invention to simplify and make less expensive a high resolution electronic still image camera system for use in conjunction with an interactive home information system.

It is a further object of the present invention to provide an interactive system for use with a simplified electronic still camera for capturing high resolution digitized images and storing the captured images for viewing on a subscriber's television or computer display monitor.

The present invention preferably employs an electronic still camera for use in association with a system for providing signal processing of raw, digitized image information representing the color and intensity value of each pixel of a captured image for a specified display or reproduction format, the camera comprising: a camera controller responsive to camera control signals for controlling operations of the camera; means for storing a camera identification code; a solid state, image capture array of color filtered, pixel photosites; an imaging lens system for focusing the image to be captured on the image capture array; image capture means responsive to an exposure control signal for exposing the image capture array to the focused image through the imaging lens system for a predetermined exposure interval in order to develop a raw, analog image information set for each color from which image luminance and chrominance signals may be derived for each captured image; driver means responsive to the camera controller for clocking out the raw, analog image information set from the image capture array upon completion of the exposure; means for digitizing the raw, analog image information set; data storage means responsive to the camera controller for temporarily storing at least one of the raw, digitized image information sets, each representing a captured image; and data communication means for retrieving and transmitting each stored raw, digitized image information set to further processing equipment.high resolution electronic still camera for use in association with an interactive system for providing centralized signal processing of raw, digitized image information representing the color and intensity value of each pixel of a captured image for a specified display or reproduction format.

The camera does not include on-board signal processing for processing the raw, digitized image information set to account for dark signal current variances or defects in individual CCD photosites of the array that are unavoidable with current CCD technology at a reasonable price or for other filtered photosite or camera related defects.

In a further aspect of the invention, such a camera is employed in a system for processing the raw, digitized image information sets to correct for such variances or defects remotely from the camera at the user's HIC or upstream in the interactive network accessed from the user's HIC for providing a corrected image data set to the user or others designated by the user. Other designees include a print or CD maker or other user's Set-Top Boxes for making print or CD reproductions or for distributing images to others.

The camera having an identification code keyed to a camera specific image defect correction map derived at manufacture from test of the camera to correct for image capture defects and a data communication controller for transmitting the camera identification code and the raw, digitized image information sets to a receiver of an interactive network is preferably used in a system and method of processing and correcting raw, digitized image information sets and converting each processed and corrected image information set into a display image format comprising the means for and steps of: transferring the image defect correction map to a repository of an interactive network accessible through a service; transferring color correction and processing software algorithms to a repository of the interactive network accessible through a service; upon receipt of a request for a processing raw, digitized image information set, the request including the camera identification code and entered in the network, transferring the camera specific defect correction map and the color correction and processing software from the repository to an image information processing system; in the image information processing system, processing and correcting each raw, digitized image information set into a designated display image format; and transferring the display image format sets to a user defined recipient on the network.

ADVANTAGES OF THE INVENTION

In accordance with the present invention, and due to the various features thereof, an inexpensive, high resolution camera may be employed with an interactive network subscribed to by a purchaser to enable electronic image capture and video display of the captured images. The expected capabilities of the emerging interactive networks and services to be provided on such networks are taken advantage of in economizing and adding flexibility to the camera.

BRIEF DESCRIPTION OF THE DRAWINGS

These and other objects, advantages and features of the invention will become apparent from the detailed description given hereinafter in relation to the accompanying drawings, in which.

DETAILED DESCRIPTION OF THE PREFERRED EMBODIMENTS

Figure 1:
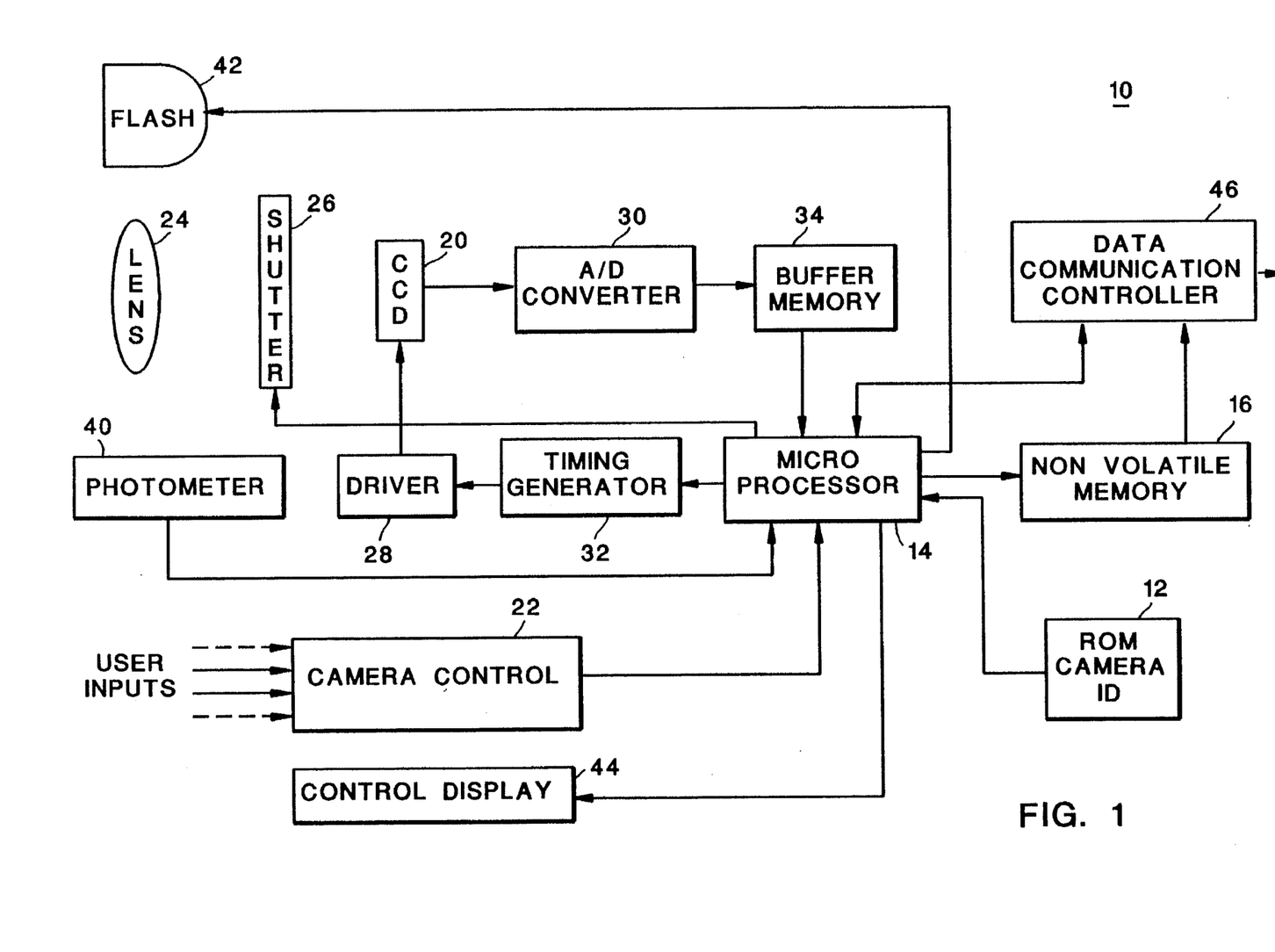
FIG. 1 is a schematic illustration of the components of an electronic still camera in which the present invention may be practiced.

As stated above, the present invention preferably employs a high resolution, but simplified, electronic still image camera for capturing an image as a set of raw, digitized image information corresponding to the pixel intensities of an image capture CCD element array. FIG. 1 is a schematic block diagram of one such camera 10 for providing the raw, digitized image information along with a camera serial number or identification (ID) code to one of the systems described in detail below for processing the image information for color correction and correction for CCD element pixel defects.

The camera 10 may be a simplified version of the cameras disclosed in the above-referenced co-pending '516 and '756 applications, incorporated herein by reference. The camera 10 may be operated in a stand-alone mode or a "docked" mode as described in the '756 application. The simplified camera 10 comprises the camera microcontroller 14 responsive to camera control signals, e.g. depression of the image capture button by the user, from control block 22 for controlling operations of the camera 10. The microcontroller 14 also controls the exposure parameters and illumination by processing output signals from photometer 40 and operating flash unit 42 when measured ambient light conditions require artificial illumination. A control liquid crystal display 44 is also provided in which camera operating and status messages may be provided to the user by the microcontroller 14 in a manner well known in the art.

A trichromatic, solid state image capture array 20, e.g. a CCD array of the type described above, is located behind an imaging lens system 24 and an optional blur filter for focusing the image to be captured on the image capture array 20. A shutter and aperture mechanism 26 is responsive to an exposure control signal from microcontroller 14 for exposing the image capture array 20 to the image focused thereon by the lens system 24 in a conventional fashion. The image capture array 20 is responsive to a driver 28 in order to the develop trichromatic, raw, analog image information which is amplified and supplied to an A/D converter 30. The array driver 28, operated by a timing generator 32 in response to the microcontroller 14, clocks out the raw, analog image information to the A/D converter after the exposure of the array 20 is complete. The A/D converter 30 digitizes the raw, analog image information as an information set and supplies it to a buffer memory 34. The information set is then retrieved by the microcontroller 14 and optionally subjected to compression before being stored in non-volatile memory 16 along with the camera ID code. The camera serial number or ID code is stored in ROM 12 at manufacture.

The memory 16 is preferably a non-removable flash, electrically-programmable read only memory (FLASH EPROM), although a hard disk drive, a floppy disk drive, a removable memory IC card or a similar device could be used. Different types of compression could be employed, e.g. a conventional adaptive differential pulse code modulation (ADPCM) technique.

The contents of the memory 16 are read out through a data communications controller 46 enabled by the microcontroller 14 in response to a user initiated camera control signal. The stored sets of the raw, digitized image information each representing a captured image are thereby transmitted to an image processing system and converted into a display or reproduction image format for display or for use in making a print or creating a Photo CD of the captured image.

The ID code for the camera 10, stored in memory 12 at manufacture, is read out by a camera microcontroller 14 and appended to the raw, digitized image information set for each image frame that is transferred to non-volatile memory 16. The camera 10 is tested during manufacture to determine which of the CCD array photosites of the CCD array 20 are defective. A pixel defect map associated with the ID number is created that identifies the defective photosites by row and column number. In addition, a color correction map is created that corrects for non-uniformity in the checkerboard pattern, color filter array over the photosites as well as color sensitivity variations in the photosites. The color correction map compensates for gamma and individual photosite or overall white balance errors in a well known manner. Optical aberrations in the lens system 24 of the individual camera 10 could also be measured and stored with the color correction map. In addition, imbalances in the flash illumination could also be measured at manufacture of the camera and stored as an illumination correction map keyed to the photosite locations. In accordance with the present invention, the ID code retrieved from memory 12 and stored with the raw, digitized image information sets is used to in turn retrieve the correction maps of that same camera for use in processing the information sets.

In this regard, the raw, digitized image information set for each captured image is transmitted remotely of the camera 10 with the camera ID code to complete color processing and to construct a corrected image information set in the display image format that is returned to the user for display on a video monitor. The corrected image information may be formatted to an NTSC standard for display on a conventional television or formatted in a reproduction format for a particular color printer for printing as a color print or as a CD.

More particularly, at the remote processing and correction location, the raw, digitized image information is processed in a conventional fashion to derive luminance and chrominance. A green layer interpolation is effected, and color difference generation of Red-Green and Blue-Green is effected.

The image capture defect or correction maps stored for the particular camera are retrieved from a source using the camera ID code. In the examples described below, the correction maps are stored in a central or somewhat distributed repository (data bank) of any suitable storage medium and format and accessed in a variety of ways. When accessed, white balance normalization is effected employing the color correction map. Color correction is accomplished by shifting or scaling any or all pixel values that require normalization.

The pixel defect map is employed to identify false data bits and to initiate interpolation of scene content from surrounding valid pixel values. A processing algorithm may be employed that takes into account color information of adjacent pixels to generate suitable replacement color information for the defective pixel location in a manner well known in the art. Similarly, optical aberrations and artificial illumination hot spots could also be corrected for, if the camera specific correction maps are derived at manufacture and stored in the repository. In all cases, correction of the pixel signal levels can be effected by either a scaling function, an offset, or a combination of both, in a manner well known in the art.

Thus, the camera 10 of FIG. 1 is simplified so as to reduce the expense of the camera while retaining a high resolution and image quality of the resulting displays or reproductions of the captured images. In particular, the CCD array preferably provides a resolution which would be able to produce an image equivalent to what the printing industry refers to as a screen of 140 when appearing in the intended display image or reproduction image medium.

Figure 2:
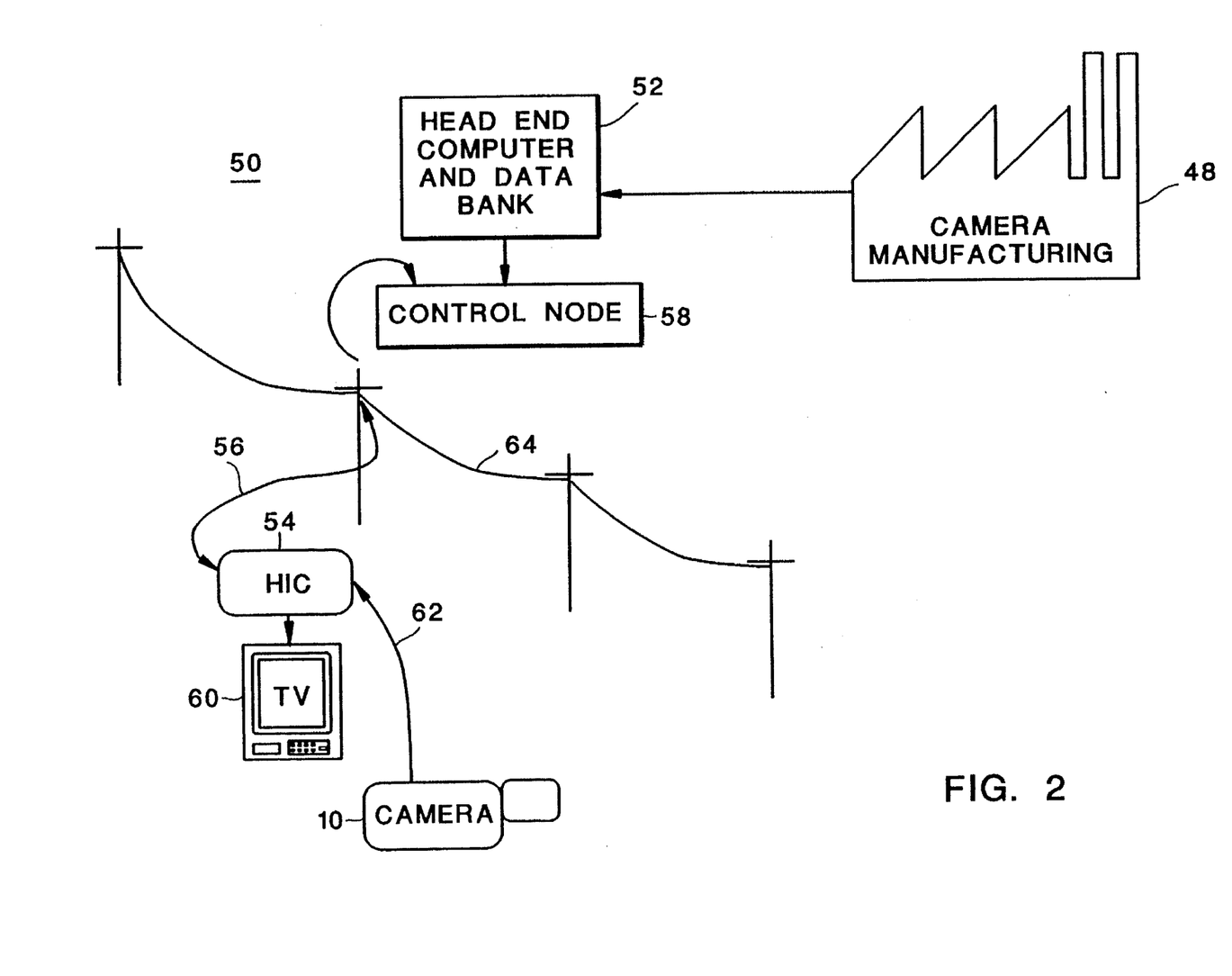
FIG. 2 is a schematic illustration of the interrelationship between the camera of FIG. 1 and an interactive network for communication through an HIC.
Figure 3:
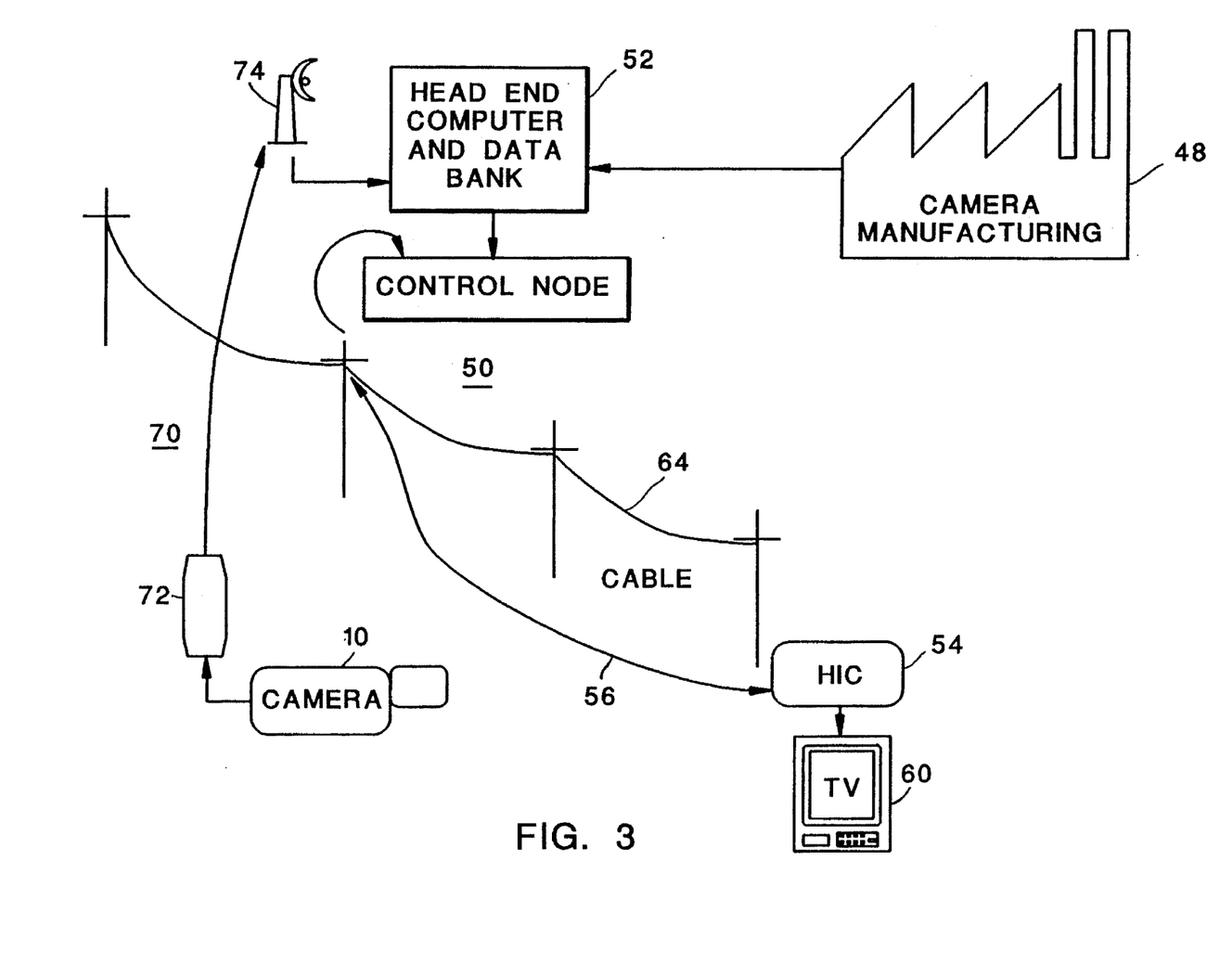
FIG. 3 is a schematic illustration of the interrelationship between the camera of FIG. 1 and an interactive network providing signal communication through a PCS or cellular phone link.
Figures 4, 4A:
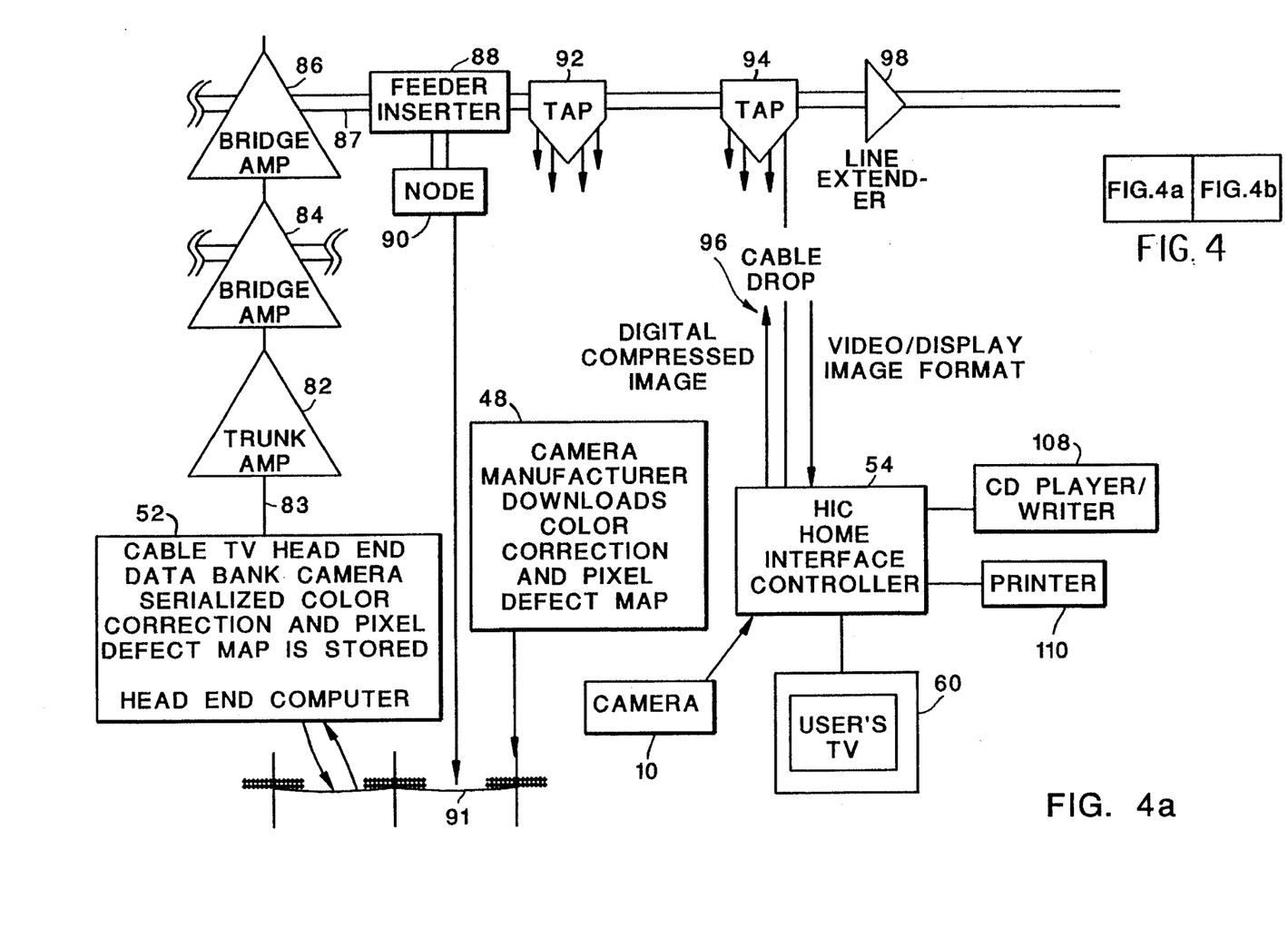
FIG. 4 is a schematic illustration of the interconnection of an interactive network leg with the simplified electronic still camera through the HIC or the alternative links.
Figure 4B:
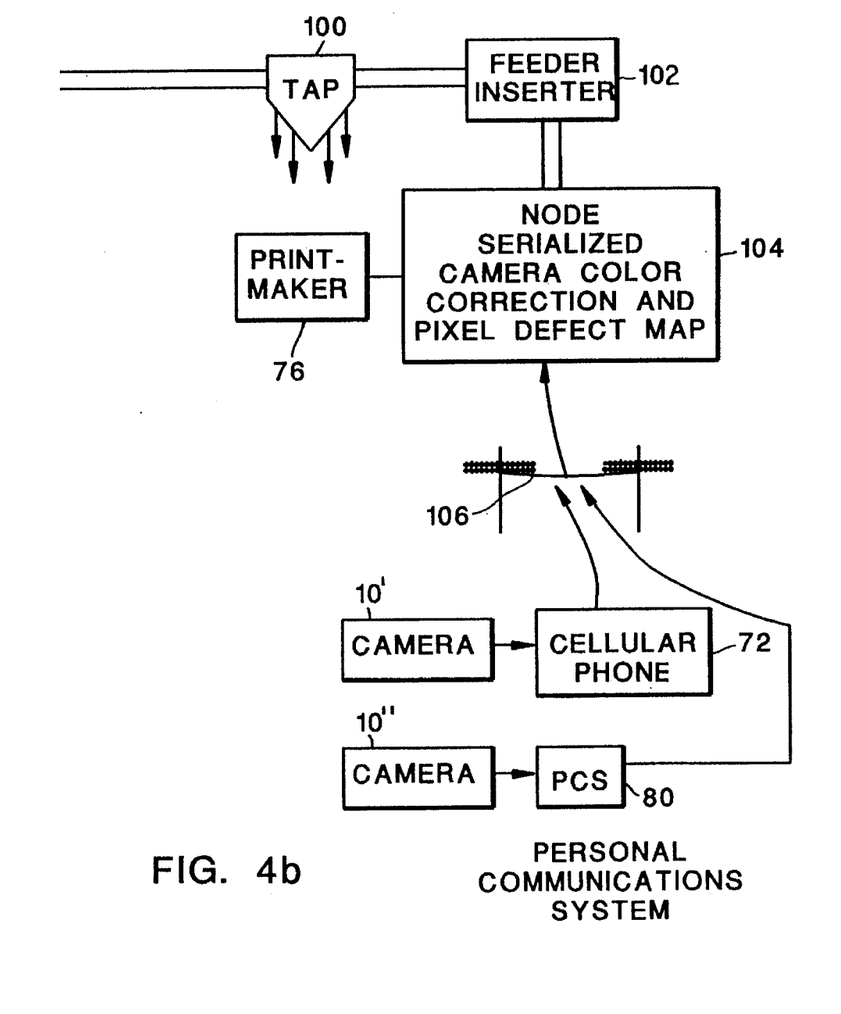

Turning now to FIGS. 2–4, the camera 10 of FIG. 1 is preferably employed in a first system embodiment of the invention employing an interactive network of the type disclosed in the above-referenced '420 patent, incorporated herein by reference, modified to provide the signal processing and correction of the raw, digitized image information into a video image signal. The structure and organization of the interactive network, popularly referred to as the "Information Highway", are not yet known, as the specifications and standards are presently subject to negotiations between government and a wide cross-section of telecommunication and imaging industry representatives. Presumably, house-to-house wire or optical fiber cable will be a principal communication mode, although satellite transceiver communication may also be included in the network.

The HIC or Set-Top Box for interactive TV applications will likely be based on a microcomputer controlling signal input and output channels and responsive to several user inputs, but the specific configuration is not yet known. Two possible HIC configurations are described in articles by Junko Yoshido appearing in *Electronic Engineering TIMES* in the Nov. 29, 1993, and Dec. 6, 1993, editions at pages 1 and 8 in each issue. In each case, the system includes upstream and downstream data and signal transmission for providing the interactive capability of the home user to communicate with other users, access network service providers and select programming. It is not yet known if signal communication between peripheral equipment, including a personal computer, television, printer, CD player, writer, modem or image capture means, including the electronic still camera of the present invention, will be by wire cable, infra-red light beams, optical fiber or RF transmission. The HIC may also be structured as shown in the above-referenced '420 patent to include a remote control, infrared transceiver for communication with a remote control unit and keyboard, a video cable input from a video camera or VCR, a hard copy printer cable output and a telephone company subscriber line interface.

Despite the present configuration uncertainties, it is possible to set forth the characteristics of a system in accordance with the present invention that may be implemented with the interactive network and the general characteristics of the components under consideration. In accordance with a first variation of the first embodiment of the system the present invention, a user who purchases a camera 10 shown in FIG. 1 would sign up for image capture service on the user's interactive account. The ID code of the user's camera 10 is then linked to the user's account, and the correction and processing code, including the specific camera correction maps, is delivered electronically from the camera manufacturing facility and made resident in a network repository, e.g. a headend computer or a node. Then, in use as described below, the user would be able to initiate upstream transmission of the raw, digitized image information to the network for processing and correction and return of the corrected image information to the user's HIC for display, storage or printing.

Alternatively, since the HIC will likely be based on a powerful micro-processor based computer and will have high level video signal processing for other reasons, it would be possible to do the processing and correction at the user's HIC. In this embodiment, the user sign up for service where the conversion software along with the camera's correction code would be downloaded to the HIC for use by the user. This could be effected on a one time basis on registration of the camera.

Turning to FIG. 2, it schematically illustrates a first simplified interactive network 50 for accomplishing this operation using the Set-Top Box or HIC 54 as the communication link for both transmitting the raw, digitized image information from the camera 10 upstream on the network 50 and receiving the processed and corrected digitized image information and/or video image frame for display on the user's television 60. The correction and conversion software as well as the specific correction code associated with the camera ID code is provided from the camera manufacturer 48 to a headend computer 52 coupled to the network 50. In a first variation of this embodiment of the system, at the time of service enrollment, the specific correction code and software for the specific camera serial number would be transferred to the interactive control node 58 accessed by the subscriber/user of the camera 10.

The Set-Top Box or HIC 54 is coupled to the monitor or television 60 in the manner described in the above-referenced '420 patent, for example, to receive and transmit video images and user generated signals. The raw, digitized image information sets and associated camera ID code are received by the HIC 54 through a communications link 62 (of any of the types described above) from the data communications controller 46 of camera 10. The HIC 54 transmits the raw, digitized image information sets and associated camera ID code through house cable 56 and a tap (shown in FIG. 4) to a line cable 64 and from there to the interactive control node 58.

At the control node 58, the processing and correction is conducted as described above to derive the corrected, digital image information set. The control node 58 may take the form of that shown in FIGS. 6A and 6B and described in the '420 patent, incorporated herein by reference. The corrected, digital image information set in the display image format or the video frame is then transmitted back to the HIC 54 on house cable 56.

Data compression techniques may optionally be employed to facilitate the transmission of the digitized image information sets from the HIC 54 to the interactive control node 58. At the interactive control node 58, each compressed raw, digitized image information set is restored prior to color processing and correction. Then, the corrected image information set is transformed by imaging software to an optionally compressed video image frame signal. The compressed or un-compressed video image frame signal is transmitted back to the HIC 54 for decompression and display by the monitor or television 60 or for storage in memory of an associated PC or print-out by a color printer attached to the HIC 54.

Alternatively, in a variation, the HIC 54 may include, in resident memory, the image correction software for color balance and pixel defect correction and for conversion of the corrected signals into video signals. In one variation of this alternative, the HIC 54 would automatically request and retrieve the stored correction code from the interactive control node 58 and conduct the correction and conversion locally each time raw, digitized image information sets are to be processed. In a second variation, the registration of the user's camera ID code and identification of the user's service provider and node address may be supplied to the manufacturer 48 so that the processing software and correction codes may be downloaded to the user's HIC 54 for storage and use as desired. The HIC 54 in this variation may take the form of that shown in FIG. 14 of the '420 patent which is described therein.

In these embodiments, the HIC 54 may be provided with a user input keyboard or the like to communicate a separate destination for the corrected digitized image information than the user's HIC 54. For example, the user may employ a vendor code and order instructions for transferring the corrected digitized image information to a printing company with instructions to make prints or create a Photo CD with the images for physical delivery back to the user.

FIG. 3 is a further embodiment of the invention wherein the communication link between the camera 10 and the interactive control node 58 is through a cellular data link 70, or a Personal Communication Services (PCS) link, rather than the user's HIC 54. The communication between the camera 10 and the link 70 is by a cellular modem 72 and cellular transmission system 74 coupled to the headend computer 52 and control node 58. Processing and correction using the stored correction code is accomplished in the control node 58 as described above. The corrected, digitized image information sets are then downloaded to the designated HIC 54 for display, storage or printing as described above.

Turning now to FIG. 4, it depicts in more specific detail a schematic diagram of a segment of the interactive network 50 with a variety of input and output configurations as described above. The interactive network segment depicted in FIG. 4 is exemplary of a potential system architecture that may be implemented and in which the present invention may be practiced. The system architecture of FIG. 4 is similar to that shown in the above-incorporated '420 patent. The headend computer 52 and the characteristics of components 82–106 are described therein and are only described herein to the extent deemed necessary to explain how the system of the present invention functions in such a context.

The components 82–106 include the trunk amp 82 receiving the data modulated RF carrier output of the headend computer 52 which includes programming for distribution on the trunk cable 83 and on the feeder cables attached to bridger amps 84, 86, etc. Each feeder cable, e.g. feeder cable 87 supplies programming and data from the headend computer 52 to a series of control nodes, e.g. control nodes 90 and 104 where it is stored for distribution to HICs and other interfaces. The control nodes 90 and 104 are coupled to the feeder cable 87 by a feeder inserter, e.g. feeder inserters 88 and 102, respectively. A series of taps, e.g. taps 92, 94 and 100 are spaced along the feeder cable 87 from which cable drops to user HICs extend. Periodically, the signal in feeder cable 87 is amplified by line extenders 98.

The signal transmission to and from an HIC 54 can be both ways along the cable drop 96 and feeder cable 87 to and from an associated control node, e.g. node 90 or node 104. Communications, e.g. user responses, from the control nodes 90 and 104 to the headend computer 52 may be via a telecommunications link 91. The headend computer 52 also receives updated programming and supplies user data to a regional processing center (not shown) also via the telecommunications link 91.

As described above, when the camera purchaser registers the camera with the manufacturer for warranty service, the user is authorized to sign up for the service through his service provider. The camera ID code and the user's HIC address are linked. In accordance with one aspect of the present invention, the camera manufacturer 48 downloads the correction codes and processing algorithms with the camera ID to the headend computer 52 via the link 91. The ID code is used to identify the correct user HIC 54, and the correction code and processing algorithms are distributed by the headend computer 52, using the ID code, to the proper control node 90. The processing algorithms downloaded to the control node 90 can be accessed by the user so that the raw digitized image information sets transmitted from the user HIC 54 to the control node 90 can be processed with color pixel defect correction.

In one variation of the preferred embodiment, the processed and corrected, digitized image information sets are transmitted back to the user's HIC 54 or to any other designated HIC for permanent storage, viewing or digital printing. Alternatively, if the HIC 54 has the capability, the correction code and processing algorithm may be downloaded to the user's HIC 54 for storage and use in processing and color correcting the raw, digitized image information sets in the HIC 54 as described above.

The user's HIC 54 is linked to other optional equipment, including a CD player/writer 108, a digital color printer 110 and/or the user's television or monitor 60. The CD player/writer 108 may be used with the HIC 54 to write in the processed images in Photo CD video display format or other CD format, depending on the display mode. The printer 84 may be of any of the available digital printer types.

In a further variation, the raw, digitized image information sets may be transmitted by the user through the user's HIC 54 with a print order to a designated printing establishment or print maker 76 enrolled on the network. The user's camera ID code is used to identify and download the correction code and processing algorithms from the user's node 90 or the headend computer 52, using the ID code, to the proper control node 104 for the print maker 76. The processing algorithms downloaded to the control node 104 can be accessed by the print maker 76 so that the raw digitized image information sets transmitted from the user HIC 54 to the control node 106 and to the print maker 76 can be processed with color pixel defect correction.

The control node 104 may process and correct the raw, digitized image information sets and provide the corrected image information sets to the print maker 76. Alternatively, the print maker 76 may download the camera correction code and color correction algorithms to a resident microcomputer to process the raw, digitized image information sets and make the ordered prints.

The digital cameras 10 described to this point is coupled to the user's HIC 54 either by a wire or optical fiber cable tether or by any of the known untethered or remote transmission modes. The HIC 54 is connected to the tap 94 via the cable drop 96 as described above. In a further aspect of the invention, the raw, digitized image information sets generated by alternate cameras 10' and 10" are fed by cellular phone link 72 and personal communications system (PCS) 80, respectively, to the network 50 through a traditional telecommunications link 106.

The alternate digital cameras 10' and 10" are intended for more portable use or use in video conferencing or the like, and are not coupled directly to the user's HIC. The cellular phone link 72 or the PCS 80 are employed to take advantage of the capability communicating with a control node, e.g. control node 104, via the traditional telecommunications network 106. In this case, then, the control node 104 that is accessed is provided with the camera ID code from the camera 10' or 10" along with the sets of raw digitized image information and a designation of the routing of the information sets within the network 50. Any of the above described routes can be designated, e.g. to the user's HIC 54, any other HIC or the print maker 76 or otherwise.

In each case, for each camera 10, 10' and 10", the manufacturer 48 inputs the color correction and defect maps keyed to the respective camera's ID code into the headend computer 52 data bank or other system repository when the camera is registered by the user identifying the interactive network service that the user subscribes to and the user HIC address. The processing software algorithm for processing the raw, digitized image information sets utilizing the color correction and defect maps into the proper display image format for end use display or reproduction is also provided by the manufacturer to the network service provider for loading into a suitable repository. As described above, the cameras 10, 10' or 10" are linked to the network 50 in a variety of ways to download the raw, digitized image information sets, and the processing can be conducted in a variety of sites on or off the network 50 as designated by the user.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–4 simplified camera 10, 10', 10"
ROM 12
camera microcontroller 14
non-volatile memory 16
solid state image capture array 20
control block 22
imaging lens system 24
shutter and aperture mechanism 26
driver 28
A/D converter 30
timing generator 32 buffer memory 34
photometer 40
operating flash unit 42
control display 44
data communications controller 46
camera manufacturer 48
interactive network 50
headend computer 52
Set-Top Box or HIC 54
house cable 56
interactive control node 58
user's television or monitor 60
communications link 62
line cable 64
cellular data link 70
cellular modem 72
cellular transmission system 74
print maker 76
PCS 80
trunk amp 82
trunk cable 83
bridger amps 84, 86,
feeder cable 87
feeder inserters 88, 102
control nodes 90, 104
taps 92, 94, 100
cable drop 96
line extender 98
telecommunications link 91, 106
CD player/writer 108
printer 110

We claim:

1. A system for processing and correcting raw, digitized image information sets and converting each processed and corrected image information set into a display image format comprising:

an electronic still camera having image capture means uncompensated for image capture defects for capturing a scene image as a raw, digitized image information set and digital memory for storing one or more information set, the camera having an identification code keyed to an image defect correction map derived at manufacture to map and correct for image capture defects and a data communication controller for transmitting the camera identification code and the raw, digitized image information sets from said memory to a designated receiver; and an interactive network remote from said camera further comprising:
  a receiver for receiving said transmitted, raw, digitized image information sets and said identification code and for communicating on the interactive network to transmit or receive data, including transmission of said raw, digitized image information sets;
  a repository on the interactive network for receiving the image defect correction map derived at manufacture keyed to the camera identification code;
  processing means responsive to a communication from said receiver for retrieving the image defect correction map unique to the camera identification code and for correcting and processing said each raw, digitized image information set into a display image format for display or reproduction of the captured image; and
  means for utilizing the display image format for displaying or reproducing the captured image.

2. The system of claim 1, wherein:
  said interactive network comprises an interactive, multimedia, telecommunications network with distributed processing and storage of information between user's residences and programming sources on a subscription basis with service providers; and
  said receiver comprises a user's home set-top box or HIC for interacting with the telecommunications network upon subscribing to a service on the network.

3. The system of claim 2 wherein said processing means comprises a local control node of the interactive network accessible to and from the user's home set-top box.

4. The system of claim 3 wherein said processing means is loaded with processing algorithms for the particular camera type to process the raw, digitized image information sets into the display image format and to utilize the image defect correction map specific to the camera identified by the identification code in the processing of the image information sets.

5. The system of claim 2 wherein:
  said processing means comprises the user's home set-top box or HIC; and
  said set-top box or HIC is downloaded with processing algorithms for the particular camera type and the image defect correction map for the particular camera identified by the camera identification code to process the raw, digitized image information sets into the display image format and to utilize the downloaded image defect correction map specific to the user's camera in the processing of the image information sets.

6. The system of claim 2 wherein:
  said processing means comprises a local control node of the interactive network accessible to and from a print maker authorized by a user to make reproductions of the captured images represented by raw, digitized image information sets.

7. The system of claim 6 wherein said local control node is downloaded with processing algorithms for the particular camera type and the image defect correction map for the particular camera identified by the camera identification code to process the raw, digitized image information sets into the display image format and to utilize the downloaded image defect correction map specific to the user's camera in the processing of the image information sets.

8. A method of processing and correcting raw, digitized image information sets and converting each processed and corrected image information set into a display image format comprising:

providing an electronic still camera to a user for capturing a scene image as a raw, digitized image information set, the camera having an identification code keyed to a camera specific image defect correction map derived at manufacture from test of the camera to correct for image capture defects and a data communication controller for transmitting the camera identification code and the raw, digitized image information sets to a receiver of an interactive network;

transferring said image defect correction map to a repository of an interactive network accessible through a service;

transferring color correction and processing software algorithms to a repository of the interactive network accessible through a service;

transferring the camera specific defect correction map and the color correction and processing software from the repository to an image information processing system upon receipt of a request for processing raw, digitized image information sets acquired by said camera, the request including the camera identification code;

transferring raw, digitized image information sets acquired by said camera to said image information processing system through said service; and in the image information processing system, processing and correcting raw, digitized image information set into a display image format set.

9. The method of claim 8 further comprising the step of:

transferring the display image format sets to a user defined recipient on the network.

10. The method of claim 8, wherein:

said interactive network comprises an interactive, multimedia, telecommunications network with distributed processing and storage of information between user's residences and programming sources on a subscription basis with service providers; and said defined recipient comprises a user's home set-top box for interacting with the telecommunications network upon subscribing to a service on the network.

11. The method of claim 10 wherein said image processing system comprises a local control node of the interactive network accessible to and from the user's home set-top box.

12. The method of claim 10 wherein said processing system comprises the user's home set-top box.

13. The method of claim 10 wherein said processing system comprises a local control node of the interactive network accessible to and from a print maker authorized by a user to make reproductions of the captured images represented by raw, digitized image information sets.

14. A system for processing sets of digitized image information and converting each processed image information set into a display image format, said system comprising:

an electronic camera that generates a camera identification code and sets of digitized image information corresponding to captured images, said camera including a data communications means for transmitting the camera identification code and the sets of digitized image information when instructed by a camera user;

an interactive network remote from said camera, said network comprising:

means for communicating with the interactive network to transmit or receive data, including transmission of the digitized image information sets and the identification code;

a receiver for receiving the digitized image information sets and the identification code transmitted from said camera by the data communications means;

a repository on the interactive network for receiving one or more processing algorithms keyed to the camera identification code;

means for downlinking said one or more processing algorithms on the interactive network to the repository from a remote source distinct from the camera user; and processing means responsive to a communication from said receiver for retrieving said one or more processing algorithms keyed to the camera identification code and for processing each digitized image information set into a display image format for display or reproduction of the captured image.

15. The system of claim 14 wherein the remote source of the algorithms distinct from the camera user is a manufacturer of the camera.

16. The system of claim 14 wherein said camera includes an image capture array composed of photosites and a memory for storing the camera identification code, and wherein said data communication means includes means for retrieving and transmitting the camera identification code with the stored sets of digitized image information.

17. The system of claim 16 wherein the camera identification code is correlated to a photosite defect map identifying any defective photosites of the image capture array by row and column number.

18. The system of claim 16 wherein the camera identification code is correlated to a color correction map compensating for the degrees of any non-uniformities in color responses of the photosites to color of a test image captured by the image capture array by row and column number.

19. The system of claim 18 wherein the color correction map compensates for gamma and individual photosite or overall white balance errors.

20. The system of claim 18 wherein the camera includes an imaging lens system and the color correction map compensates for optical aberrations in the imaging lens system affecting the photosite response.

21. The system of claim 18 further comprising:

means for providing artificial illumination of the captured images; and wherein the color correction map compensates for imbalances in the artificial illumination keyed to the photosite locations affecting the photosite response.

22. The system of claim 14 wherein said means for communicating with said interactive network comprises a communication link between the data communications means and the receiver.

23. The system of claim 14 wherein said means for communicating with said interactive network further comprises a cellular telephone communications link.

24. The system of claim 14 wherein said means for communicating with said interactive network comprises a personal communications system link.

25. The system of claim 14, wherein:

said interactive network comprises an interactive, multimedia, telecommunications network with distributed processing and storage of information between user's residences and programming sources on a subscription basis with service providers; and said receiver comprises a user's home interface controller (HIC) for interacting with the telecommunications network upon subscribing to a service on the network.

26. The system of claim 25 wherein said processing means comprises a local control node of the interactive network accessible to and from the user's HIC.

27. The system of claim 26 wherein said processing means is loaded with the processing algorithms keyed to the camera identification code to process the digitized image information sets into the display image format and to utilize the processing algorithms keyed to the identification code in the processing of the image information sets.

28. The system of claim 25 wherein:

said processing means comprises the user's HIC; and said HIC is downloaded with the processing algorithms keyed to the camera identification code to process the digitized image information sets into the display image format and to utilize the downloaded algorithms in the processing of the image information sets.

29. The system of claim 25 wherein:

said processing means comprises a local control node of the interactive network accessible to and from a print maker authorized by a user to make reproductions of the captured images represented by digitized image information sets.

30. The system of claim 29 wherein said local control node is downloaded with processing algorithms for the particular camera identified by the camera identification code to process the digitized image information sets into the display image format and to utilize the downloaded algorithms specific to the user's camera in the processing of the image information sets.

* * * * *